(12) United States Patent
Hartman et al.

(10) Patent No.: US 10,852,438 B2
(45) Date of Patent: Dec. 1, 2020

(54) LIDAR WAVEFORM CLASSIFICATION

(71) Applicant: Caterpillar Inc., Peoria, IL (US)

(72) Inventors: Mark E. Hartman, Edwards, IL (US);
Weston Taylor, Groveland, IL (US);
Nathaniel W. Hart, Dunlap, IL (US);
Thomas Joseph Houchin, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 565 days.

(21) Appl. No.: 15/682,072

(22) Filed: Aug. 21, 2017

(65) Prior Publication Data

US 2019/0056504 A1 Feb. 21, 2019

(51) Int. Cl.
| | | |
|---|---|---|
| *G01S 17/00* | (2020.01) | |
| *G01S 17/931* | (2020.01) | |
| *G01S 17/89* | (2020.01) | |
| *G01S 17/42* | (2006.01) | |
| *G01S 7/48* | (2006.01) | |
| *G01S 7/4863* | (2020.01) | |
| *G01S 7/4865* | (2020.01) | |
| *G01S 17/95* | (2006.01) | |

(52) U.S. Cl.
CPC .......... *G01S 17/931* (2020.01); *G01S 7/4802* (2013.01); *G01S 7/4863* (2013.01); *G01S 7/4865* (2013.01); *G01S 17/42* (2013.01); *G01S 17/89* (2013.01); *G01S 17/95* (2013.01)

(58) Field of Classification Search
None
See application file for complete search history.

(56) References Cited

U.S. PATENT DOCUMENTS

| | | | | |
|---|---|---|---|---|
| 5,015,099 | A | * 5/1991 | Nagai | ........... G01N 21/39 250/338.5 |
| 5,202,570 | A | * 4/1993 | Tanaka | ........... G01N 21/39 250/205 |
| 5,627,511 | A | 5/1997 | Takagi et al. | |
| 5,767,976 | A | * 6/1998 | Ankerhold | ........ G01N 21/3504 250/338.5 |
| 5,880,836 | A | * 3/1999 | Lonnqvist | ........... G01S 17/95 356/336 |
| 6,055,042 | A | 4/2000 | Sarangapani | |
| 6,278,961 | B1 | * 8/2001 | Kadtke | .............. G06K 9/6217 702/189 |

(Continued)

FOREIGN PATENT DOCUMENTS

JP  2010286307 A  12/2010

OTHER PUBLICATIONS

Sallis, Air Pollution and Fog Detection through Vehicular Sensors, 2014 8th Asia Modelling Symposium, pp. 181-186, 2014 (Year: 2014).*

*Primary Examiner* — Hovhannes Baghdasaryan
(74) *Attorney, Agent, or Firm* — Brannon Sowers & Cracraft (57) ABSTRACT

A system and method for controlling movement of a machine or a portion of the machine. The method comprises processing a waveform based on detected reflected light and a derivative of the waveform. The waveform includes a return. The method further comprises classifying the return as a phantom target or a non-amorphous target based on the result of the processing, and controlling movement of the machine or a portion of the machine based on the result of the classifying the return.

17 Claims, 4 Drawing Sheets

(56) References Cited

U.S. PATENT DOCUMENTS

| | | | |
|---|---|---|---|
| 6,393,377 B1 | 5/2002 | Shirai et al. | |
| 6,518,562 B1 * | 2/2003 | Cooper | G01J 3/433 |
| | | | 250/222.2 |
| 7,075,653 B1 * | 7/2006 | Rutherford | G01F 23/14 |
| | | | 250/338.5 |
| 7,640,122 B2 | 12/2009 | Levesque et al. | |
| 7,761,236 B2 | 7/2010 | Samukawa et al. | |
| 7,961,301 B2 | 6/2011 | Earhart et al. | |
| 8,077,074 B2 | 12/2011 | Venkatachalam et al. | |
| 8,126,642 B2 | 2/2012 | Trepagnier et al. | |
| 8,508,721 B2 | 8/2013 | Cates et al. | |
| 8,908,159 B2 | 12/2014 | Mimeault | |
| 9,097,800 B1 | 8/2015 | Zhu | |
| 9,568,611 B2 | 2/2017 | Cosatto et al. | |
| 9,884,585 B1 * | 2/2018 | Lubbers | B60Q 1/525 |
| 10,197,470 B2 * | 2/2019 | Waxman | G01M 3/38 |
| 2007/0222969 A1 * | 9/2007 | Millgard | B64F 1/002 |
| | | | 356/4.01 |
| 2008/0210881 A1 * | 9/2008 | Harris | G01S 17/95 |
| | | | 250/393 |
| 2010/0023265 A1 * | 1/2010 | Huang | B60W 40/06 |
| | | | 702/1 |
| 2012/0044476 A1 * | 2/2012 | Earhart | G01S 3/7867 |
| | | | 356/4.01 |
| 2013/0044310 A1 | 2/2013 | Mimeault | |
| 2014/0324266 A1 * | 10/2014 | Zhu | G01W 1/00 |
| | | | 701/23 |
| 2015/0015869 A1 * | 1/2015 | Smith | G01S 17/023 |
| | | | 356/28.5 |
| 2016/0097716 A1 * | 4/2016 | Gulati | A61B 5/02416 |
| | | | 250/339.01 |
| 2016/0325682 A1 * | 11/2016 | Gupta | B60R 1/00 |

\* cited by examiner

LIDAR WAVEFORM CLASSIFICATION

TECHNICAL FIELD

The present disclosure generally relates to control processes for controlling autonomous movement in machines and vehicles.

BACKGROUND

Vehicles (including autonomous vehicles) may use Light Detection And Ranging (LIDAR) systems to guide movement of the vehicles or to stop movement of the vehicles. LIDAR may be used to survey the area in which the vehicle is operating.

Such LIDAR systems generally emit laser light beams. When that emitted light beam encounters a target in its path, reflected return light is detected by the LIDAR system. LIDAR systems calculate the time that elapses from the moment the light beam is emitted to when the reflected light is received to determine distance to a target. As is known in the art, the LIDAR system return data is typically incorporated into a cloud of points ("point cloud data"). Point cloud data is a set of data points in a coordinate system that represents external surfaces and is processed to classify the object(s) or terrain that it represents. Differences in laser return times and wavelengths (of the reflected return light) can be used to make digital representations of detected objects and surrounding terrain.

Autonomous control of a vehicle or machine includes the ability to avoid objects (rocks, trees, other vehicles, walls, etc.) that obstruct the vehicle or machine's movement. To improve performance and increase the speed at which such vehicles or machines operate or travel, LIDAR systems are becoming more sensitive to target detection, and are detecting objects at further distances. However, these more sensitive systems tend to classify dust, rain, fog, smoke and/or the like as an object to be avoided, thus resulting in a false determination of an obstruction by the LIDAR system. This false determination frustrates the use and confidence in LIDAR systems to control vehicle or machine movement.

U.S. Pat. No. 9,097,800 discloses the use of a LIDAR scan with a radio detection and ranging (RADAR) scan. Where features are indicated by the LIDAR scan, but not the RADAR scan, such features are assumed to not include solid materials. Thus the absence of radio-reflectivity of non-solid materials is employed by the system to identify non-solid objects from among light-reflective features indicated by the LIDAR scan. A better system is desired.

SUMMARY OF THE DISCLOSURE

In accordance with one aspect of the disclosure, method for controlling movement of a machine or a portion of the machine is disclosed. The method may comprise processing, by a controller, a waveform based on reflected light, and a derivative of the waveform. The waveform includes a return. The method may further comprise classifying, by the controller, the return as from a phantom target or a non-amorphous target based on the processing, and controlling, by a machine controller, movement of the machine or the portion of the machine based on a result of the classifying.

In accordance with another aspect of the disclosure, a system for identifying phantom target returns is disclosed. The system may comprise an emission and detection module and a controller. The emission and detection module is configured to generate and emit a laser light beam and to detect reflected light from when the laser light beam is incident upon a target. The controller is configured to: process a waveform detected based on the reflected light, the waveform including a return; process a rate of change in light energy detected for the waveform; and classify the return as a phantom target or a non-amorphous target based on the processing of the waveform or the processing of the rate of change in light energy.

In accordance with a further aspect of the disclosure, a method for identifying phantom target returns is disclosed. The method may comprise: processing, by a controller, a waveform detected based on reflected light, the waveform including a return; processing, by the controller, a rate of change in light energy for the waveform; classifying, by the controller, the return as a phantom target or a non-amorphous target based on the processing of the waveform or the processing of the rate of change in light energy; and if the return is classified as a phantom target, associating a confidence level with a classification of the return as the phantom target.

DETAILED DESCRIPTION

Figure 1:
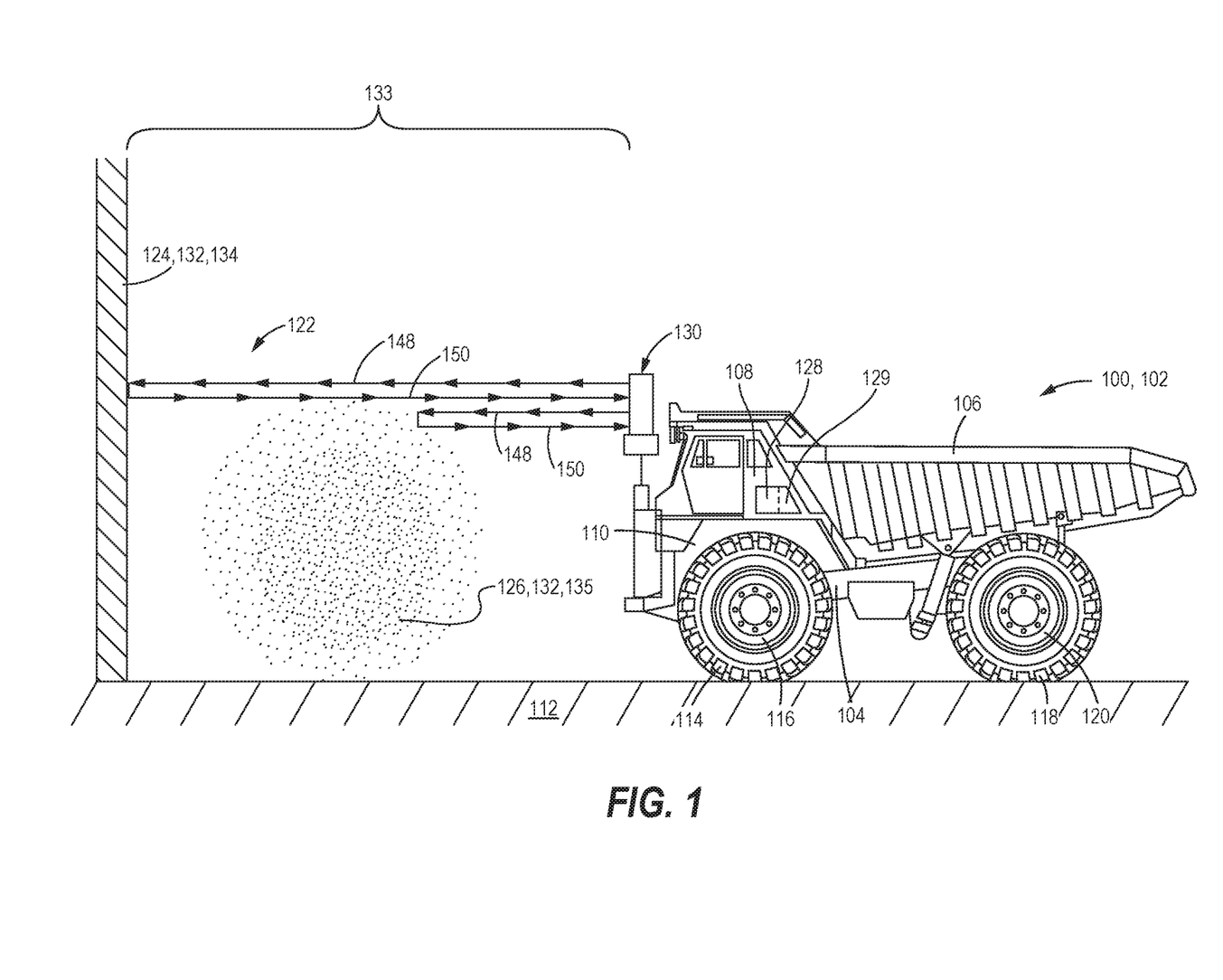
FIG. 1 is a side view of an exemplary machine 100 that includes the features disclosed herein.

FIG. 1 illustrates one example of a machine 100 that incorporates the features of the present disclosure. The exemplary machine 100 may be a vehicle such as the haul truck 102 illustrated in FIG. 1, although features disclosed herein may be utilized with other types of machines (for example, a rope shovel). The term "machine" includes vehicles or machines. The haul truck 102 illustrated in FIG. 1 includes a main frame 104, a dump body 106 pivotally mounted to the main frame 104, an operator cab 108 mounted on the front of the main frame 104 above an engine enclosure 110. The haul truck 102 is supported on the ground 112 by front tires 114 (one shown) each mounted on one of two front wheel assemblies 116, and rear tires 118 (one shown) each mounted on one of two back (driven) wheel assemblies 120. One or more engines (not shown) may be housed within the engine enclosure 110 to supply power to the driven wheel assemblies 120 via a mechanical or electric drive train. In the scenario depicted in FIG. 1, the haul truck 102 is disposed in a tunnel 122 having a back wall 124. A dust cloud 126 is shown between the haul truck 102 and the back wall 124. The machine 100 (haul truck 102) further includes a LIDAR system 130 mounted on the machine 100, a machine controller 128 configured to control movement of the machine 100 or a portion of the machine 100, and a point cloud controller 129 configured to process point cloud data. In some embodiments, the point cloud controller 129 may also generate a digital representation of the surrounding area based on the point cloud data. In some embodiments, controlling movement of the machine 100 may include adjusting the machine 100 or a portion of the machine 100

(e.g., an attachment), adjusting the direction of movement, increasing speed of movement, decreasing speed of movement, stopping movement and/or the like. While the following detailed description and drawings are made with reference to a haul truck 102, the teachings of this disclosure may be employed on other vehicles and machines for which movement or operation of the vehicle, machine, or portion of the machine (e.g., attachments on the machine), may be controlled autonomously or semi-autonomously. Furthermore, while the exemplary embodiment is a LIDAR system 130, the teachings of this disclosure may be utilized with other similar types of object detection technologies.

Figure 2:
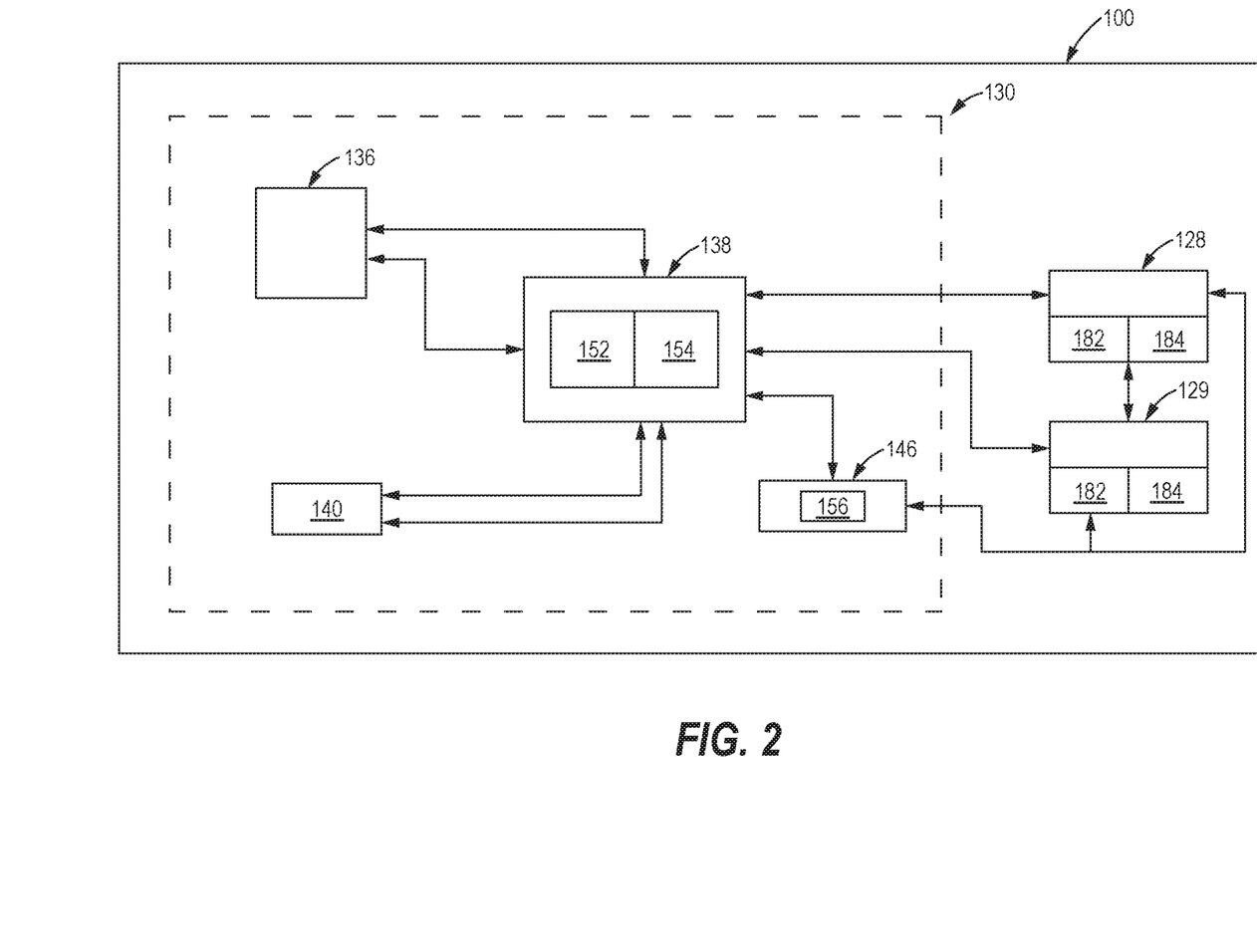
FIG. 2 is a schematic representation of an exemplary LIDAR system 130 of the machine 100 of FIG. 1.

FIG. 2 illustrates the LIDAR system 130 in more detail. The LIDAR system 130 is configure to detect and classify one or more targets 132 (see FIG. 1) in a target area 133 in the vicinity of the machine 100 (haul truck 102). In some embodiments, the LIDAR system 130 is configured to determine whether the target 132 is a non-amorphous target 134 such as an object (e.g., the wall 124 of FIG. 1) or is a phantom target 135 such as the dust cloud 126 of FIG. 1. As used herein, a non-amorphous target 134 is a target 132 that is solid in form (e.g., the wall 124, another vehicle, a tree, other object, and/or the like) that may pose a collision hazard for machine 100. In other words, the term "non-amorphous target" may be used to refer an object that is an obstacle that needs to be avoided to prevent collision. In stark contrast, as used herein, a "phantom target" is a target 132 that is amorphous in form (for example, the dust cloud 126, fog, smoke, or the like) and does not pose a collision hazard for a machine 100 during operation of the machine 100 or operation of a portion of the machine 100. In other words, the term "phantom target" may be used to refer an object that is not an obstacle that needs to be avoided to prevent collision. In this regard, the term phantom target 135, as used herein, also includes rain and falling snowflakes because in the context of autonomous control or semi-autonomous control of a (moving or operating) machine 100, rain and falling snowflakes are not obstacles that need to be avoided to prevent collision.

The LIDAR system 130 (FIG. 2) comprises an emission and detection module 136, and a controller 138. The LIDAR system 130 may further comprise a Global Positioning System (GPS) 140 (or the like). The LIDAR system 130 may further comprise a user interface 146.

The emission and detection module 136 is in operable communication with the controller 138. The emission and detection module 136 is configured to generate and emit one or more streams of laser light beams 148 (e.g., pulsed laser light beams) (FIG. 1). The emission and detection module 136 is further configured to detect reflected light 150 (from when the emitted laser light beam 148 is reflected off a target 132), and to determine the time that it takes each emitted laser light beam 148 to travel to the target 132, be reflected off the target 132 and then travel back to the emission and detection module 136. The emission and detection module 136 may be mounted on the machine 100 (e.g., on the haul truck 102). Referring back to FIG. 1, the emission and detection module 136 is illustrated as emitting a stream of laser light beams 148 into the target area 133 in which the wall 124 is present, and the dust cloud 126. In the exemplary embodiment shown in FIG. 1, the emitted laser light beam 148 is a pulsed laser light beam 148.

Referring now to FIG. 2, the GPS 140 (FIG. 2) is in operable communication with the controller 138. The GPS 140 is configured to determine the position (x, y, z coordinates) of the emission and detection module 136 in 3-D space. Because the emission and detection module 136 is mounted on a machine 100 that may be moving, the GPS 140 is configured to update the position periodically and to provide such updated position to the controller 138.

The controller 138 is in operable communication with the point cloud controller 129 and the machine controller 128. In some embodiments, the functionality of the controller 138, the point cloud controller 129 and the machine controller 128 may be combined in one controller, or alternatively may be modules encompassed by one controller. The controller 138 may include a processor 152 and a memory component 154. The processor 152 may be a microprocessor or other processor as known in the art. The processor 152 may execute instructions and generate control signals for processing a waveform 160 (see FIG. 3) detected based on reflected light 150 and processing a rate of change in light energy (a derivative) 172 detected for the waveform 160; and classifying the return 162 as a phantom target 135 (FIG. 1) or a non-amorphous target 134, as described later herein. The processor 152 (FIG. 2) may also be configured to determine the intensity 165 (FIG. 3), the return width 166, the integral 168 and the return ratio as described later herein. Such instructions that are capable of being executed by a computer may be read into or embodied on a computer readable medium, such as the memory component 154 or provided external to the processor 152. In alternative embodiments, hard wired circuitry may be used in place of, or in combination with, software instructions to implement a control method.

The term "computer readable medium" as used herein refers to any non-transitory medium or combination of media that participates in providing instructions to the processor 152 for execution. Such a medium may comprise all computer readable media except for a transitory, propagating signal. Forms of computer-readable media include, for example, any magnetic medium, a CD-ROM, any optical medium, or any other medium from which a computer processor 152 can read.

The user interface 146 is in operable communication with the controller 138. In some embodiments, user interface 146 may also be in operable communication with the point cloud controller 129 and/or the machine controller 128. The user interface 146 may include a display 156 and is configured to receive user input and to display on the display 156 output received from the controller 138, the point cloud controller 129 or the machine controller 128. Such output may include information that identifies one or more classified targets 132, digital representations (or graphical representations) of the surrounding area in the vicinity of the machine 100, notifications of the detection of a phantom target 135, or the like.

The machine controller 128 is in operable communication with the point cloud controller 129, and is configured to control movement of the machine 100 or a portion of the machine 100. The point cloud controller 129 is configured to process point cloud data. Data for the point cloud may be received from the controller 138. Similar to the controller 138, the machine controller 128 and the point cloud controller 129 may each include one or more processors 182 and memory components 184. As discussed earlier, the processor 182 may be a microprocessor or other processor as known in the art. The processor 182 of the machine controller 128 may execute instructions and generate control signals to control movement of the machine 100 or portion of the machine 100. The processor 182 of the point cloud controller 129 may execute instructions and generate control signals to process data representing the return 162 received from the controller 138. The processor 182 of the point cloud controller 129 processes such data to classify the object(s) or terrain that it represents to provide a digital representation of the surrounding area in the vicinity of the machine 100. Such instructions that are capable of being executed by a computer may be read into or embodied on a computer readable medium, such as the memory component 184 or provided external to the processor 182. In alternative embodiments, hard wired circuitry may be used in place of, or in combination with, software instructions to implement a control method.

INDUSTRIAL APPLICABILITY

Figure 4:
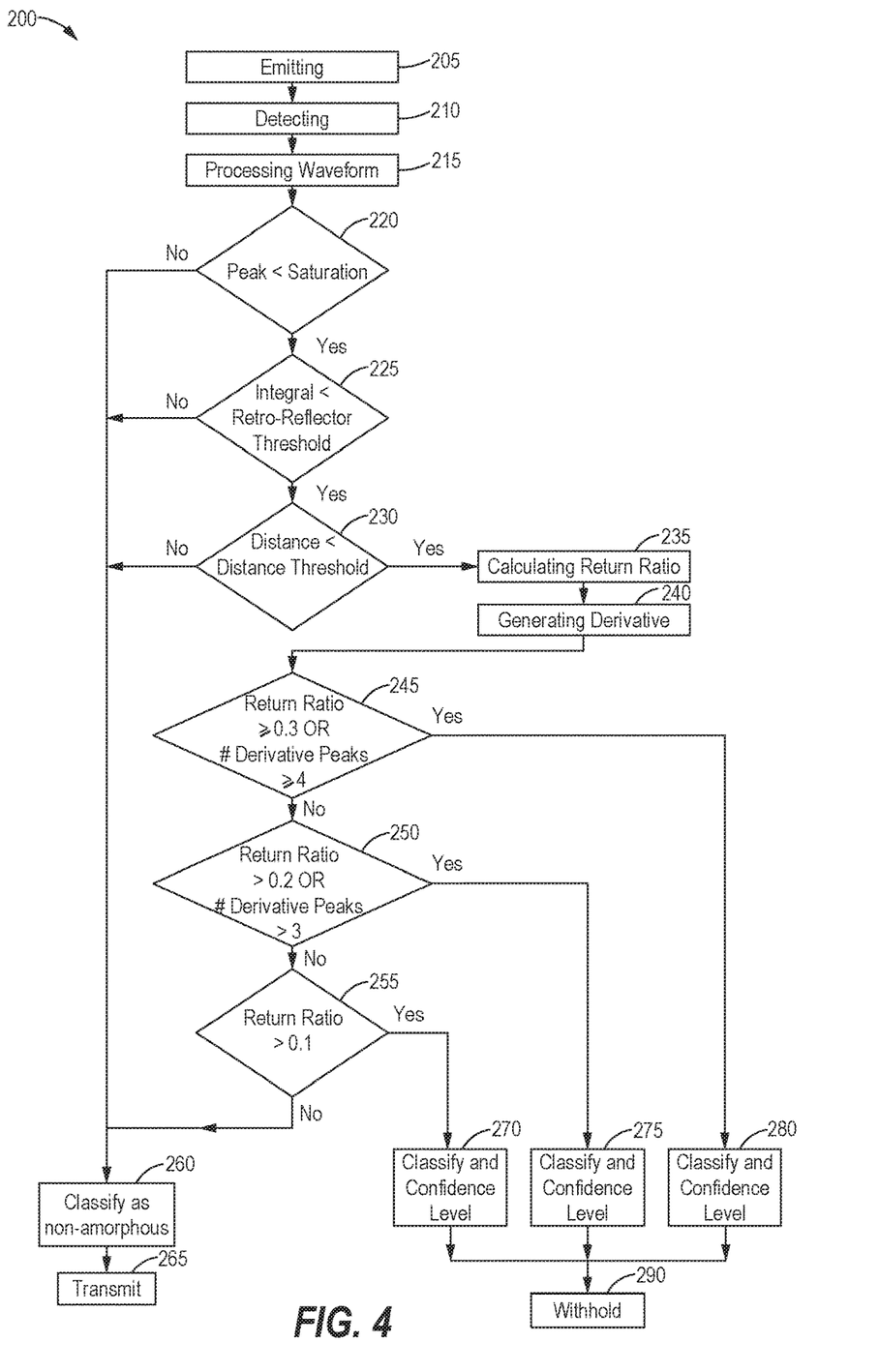
FIG. 4 is an exemplary process for identifying and excluding one or more LIDAR phantom target 135 returns 162 from inclusion in point cloud data that will be subsequently processed to classify objects and/or provide a digital representation of the area in the vicinity of the machine 100.

FIG. 4 illustrates one exemplary method 200 for identifying and excluding one or more LIDAR phantom target 135 returns 162 from inclusion in point cloud data that will be subsequently processed to classify objects and/or provide a digital representation of the surrounding area in the vicinity of the machine 100. Such removal of the returns 162 of phantom targets 135 is an important factor in accurately controlling operation and movement (e.g., forward, reverse, steering, lifting, dumping, etc.) of the machine 100 or a portion of the machine 100. Also, removal of the returns 162 of phantom targets 135 improves the accuracy of the digital representation of the surrounding area that may be displayed to a passenger while the machine is being autonomously or semi-autonomously controlled (e.g., during no-light or low-light conditions). The method 200 may be practiced with more or less than the number of blocks shown and is not limited to the order shown.

In block 205, the emission and detection module 136 emits a laser light beam 148 (e.g., a pulsed laser light beam 148) into a target area 133.

In block 210, the emission and detection module 136 detects reflected light 150 from when the laser light beam 148 is incident upon a target 132 in the target area 133. More specifically, the emission and detection module 136 detects a waveform 160 (see FIG. 3) of the reflected light 150 and transmits such information to the controller 138. The waveform 160 may include one or more returns 162. Each return 162 may have a predominant peak 164 (highest peak of the return 162 with respect to other peaks (if any) in the return 162), an intensity 165, a return width 166, and an integral 168. The intensity 165 of the return 162 is the magnitude of the predominant peak 164, and represents the strength of the return 162 (signal). The integral 168 is the area under the return 162. The return width 166 is the distance across the return 162. The return width 166 may be measured at a point such as a pre-filter 178 (this threshold is discussed below) or may be measured at another desired threshold point on the return 162. In the exemplary embodiment of FIG. 3, the return width 166 is measured at the pre-filter 178 threshold.

Figure 3:
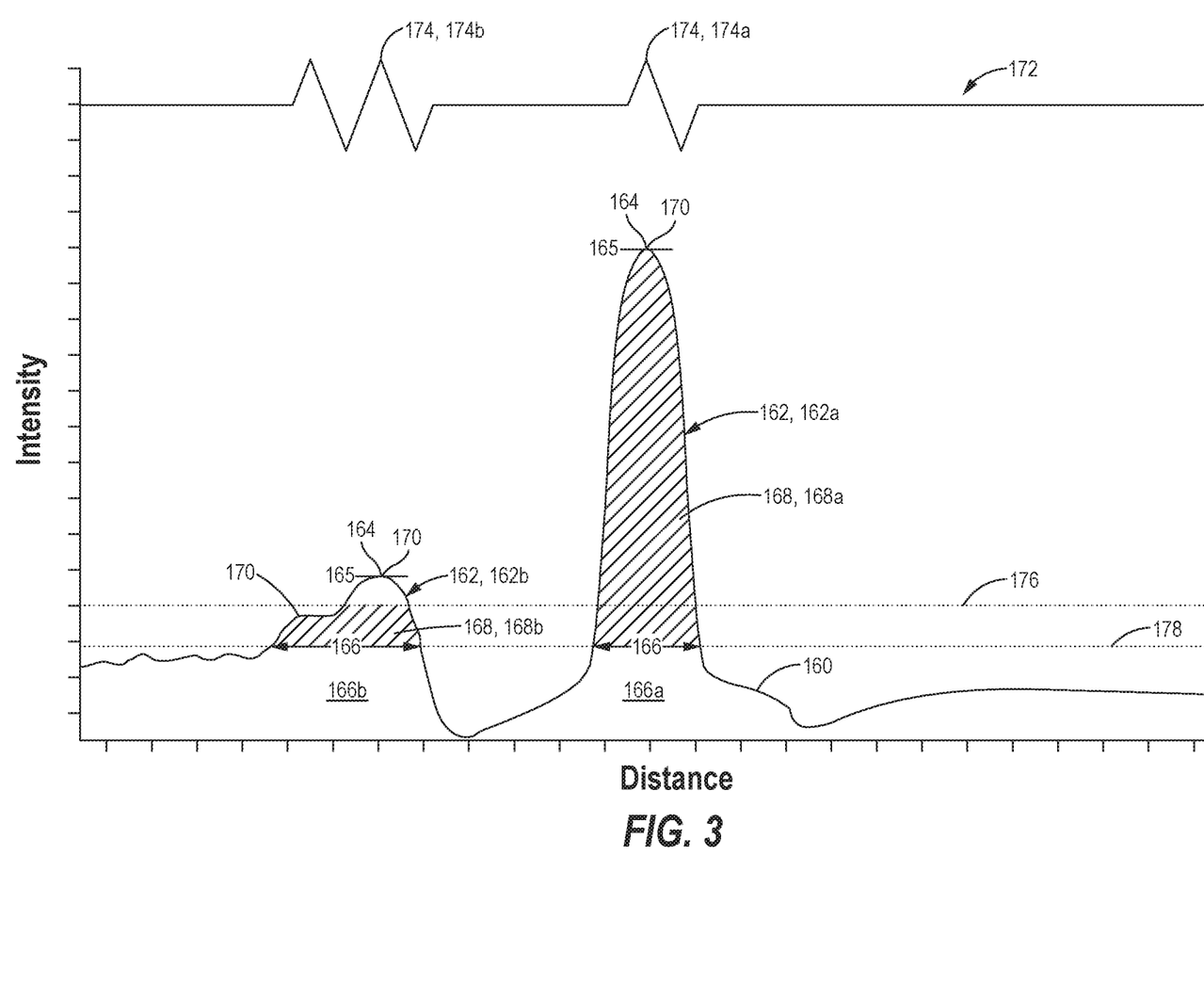
FIG. 3 is an illustration of a waveform 160 from a target 132.

FIG. 3 illustrates an exemplary waveform 160 of reflected light 150, detected from an exemplary laser light beam 148 emitted into the exemplary target area 133 shown in FIG. 1. As can be seen in FIG. 3, the exemplary waveform 160 includes a first return 162a and a second return 162b (first and second is used as a naming convention and does not indicate an order of receipt of the signal). The first return 162a has one peak 170, and that peak 170 is the predominant peak 164. The second return 162b has two peaks 170, one of which is the predominant peak 164 for that return 162. FIG. 3 also depicts the return width 166 (166a, 166b) and the integral 168 (168a, 168b) for each return 162.

The first return 162a is representative of light reflected off of a non-amorphous target 134 that is solid in form (e.g., the wall 124 in FIG. 1). The first return 162a may be Gaussian in shape, and has a narrow return width 166a relative to the intensity 165 of the first return 162a. This is because the laser light beam 148 (e.g., pulses) incident on a non-amorphous target 134, such as a wall 124, or other solid surface, tends to be reflected back at about the same time.

The second return 162b is representative of light reflected off of a phantom target 135 (such as the dust cloud 126 in FIG. 1) and may have multiple peaks 170, and a wide return width 166b relative to the intensity 165 of the second return 162b. This is because portions of the laser light beam 148 incident on a phantom target 135 may travel forward different distances before being reflected back due to the nature of the phantom target 135 (for example, reflected back by dust in a dust cloud 126, a water droplet in fog, a rain drop, etc.)

The emission and detection module 136 also determines the time that it took the emitted laser light beam 148 to travel to the target 132, be reflected off the target 132 and then travel back to the emission and detection module 136, and transmits the time to the controller 138.

In block 215, the controller 138 receives and processes the waveform 160 (see FIG. 3) of the reflected light 150 detected by the emission and detection module 136 based on the information received from the emission and detection module 136. Each return 162 of the waveform 160 is processed, as described by the method steps below.

In some embodiments of the method 200, a return 162 may only be further processed (by the controller 138) if the return 162 includes data points (of detected reflected light intensity) that are greater than a noise floor 176 (e.g., a threshold or a noise threshold). The noise floor 176 may be a constant value. The noise floor 176 allows determination of which returns 162 will be further processed and which returns 162 will not be further processed. In a refinement, a pre-filter 178 may be used in conjunction with the noise floor 176. In such a refinement, if the return 162 includes data points that are above the noise floor 176, information (e.g., data points) above the pre-filter 178 is included by the controller 138 in the calculations of the intensity 165 of the predominant peak 164, the return width 166, the integral 168 and the return ratio for a return 162. Information (e.g., data points) below the pre-filter 178 will not be used by the controller 138. FIG. 3 illustrates an embodiment in which a pre-filter 178 is utilized in conjunction with a noise floor 176. In such an embodiment, the second return 162b will be further processed because a portion of the second return 162b (more specifically, a portion of the data points of the second return 162b) lies above the noise floor (threshold) 176; and such further processing will utilize all of the data points of the second return 162b that lie above (are greater than) the pre-filter (threshold) 178.

In block 220, the controller 138 determines whether the intensity 165 of the predominant peak 164 is less than a saturation threshold. The saturation threshold is typically a constant value. Saturation may occur when highly-reflective objects are located close to the emission and detection module 136. Emission and detection modules 136 are typically calibrated to have high sensitivity to reflected light 150 in order to detect weaker intensity returns from less reflective objects. When a return 162 is received from a highly-reflective object (e.g., a license plate, reflector tape on machines), the intensity 165 of the predominant peak 164 for the return 162 may exceed the saturation threshold. In other words, the intensity 165 of the predominant peak 164 is based on the reflective characteristic of a corresponding object. If the intensity 165 of the predominant peak 164 of a return 162 is greater than or equal to the saturation threshold, the method 200 proceeds to block 260.

In block 225, the controller 138 determines whether the integral 168 of the return 162 is less than a retro-reflector threshold when the intensity 165 of the predominant peak 164 of a return 162 is less than the saturation threshold. The retro-reflector threshold is typically a constant value. As is known in the art, a retro-reflective surface (for example, a license plate, road sign, mirror) reflects a very high percentage (relative to other less reflective surfaces) of the emitted laser light beam 118 incident upon it due to its reflective properties. If the value of the integral 168 is greater than or equal to the retro reflector threshold, the method 200 proceeds to block 260.

In block 230, the controller 138 determines whether the distance from the emission and detection module 136 to the point at which the laser light beam 148 was reflected is less than a distance threshold. In one exemplary embodiment, the distance threshold may be sixty meters. In another embodiment, the distance threshold may be 40 meters. If the controller 138 determines that the distance from the emission and detection module 136 to the point at which the laser light beam 148 is reflected is greater than or equal to the distance threshold, the method 200 proceeds to block 260. Otherwise, the method 200 proceeds to block 235.

In block 235, the controller 138 calculates a return ratio for the return 162. The return ratio is the quotient that results when the return width 166 is divided by the intensity 165.

In block 240, the controller 138 processes information related to light energy detected for the waveform 160. For example, the controller 138 processes the rate of change in light energy detected for the waveform 160 or, alternatively, may process information related to the rate of change in light energy detected for the waveform 160. Such rate of change in light energy is referred to herein as a "derivative" 172 of the waveform 160. The derivative 172 may include one or more derivative peaks 174 (e.g., inflection points) for each return 162. The quantity of derivative peaks 174 are indicative of the number of inflections in the (light) return 162 and the change in light intensity. A return 162 that has multiple derivative peaks 174 may be hitting multiple objects or an object with varying surface depth. FIG. 3 illustrates an exemplary derivative 172 for each return 162 of the exemplary waveform 160. In the example shown in FIG. 3, there are four derivative peaks 174 (aggregate quantity of positive and negative peaks) for the second return 162*b* and two derivative peaks 174 for the first return 162*a*.

In block 245, the controller 138 determines whether: (a) the return ratio for the return 162 is greater than or equal to a first return ratio threshold, or (b) the quantity of derivative peaks 174 for the return 162 is greater than or equal to a first derivative threshold. To illustrate the functionality of blocks 245-255, exemplary values have been used for the return ratio thresholds and derivative thresholds in the description and in FIG. 4; in other embodiments, different values may be used. In one exemplary embodiment, the first return ratio threshold may be 0.3 and the first derivative threshold may be four (derivative peaks 174). If the controller 138 determines that either the return ratio for the return 162 is greater than or equal to the first return ratio threshold, or the quantity of derivative peaks 174 (for the return 162) is greater than or equal to the first derivative threshold, the method 200 proceeds to block 280. Otherwise, the method 200 proceeds to block 250.

In block 250, the controller 138 determines whether: (a) the return ratio for the return 162 is greater than a second return ratio threshold, or (b) the number of derivative peaks 174 is greater than a second derivative threshold. The value selected for the second return ratio threshold is less than the value of the first return ratio threshold. Similarly, the second derivative threshold is less than the first derivative threshold. For example, in the illustrative embodiment shown in FIG. 4, the value of the second return ratio threshold is 0.2 and the second derivative threshold is three (derivative peaks 174). These values are exemplary and may be different in other embodiments. If the controller 138 determines that the return ratio for the return 162 is greater than the second return ratio threshold, or the number of derivative peaks 174 is greater than the second derivative threshold, the method 200 proceeds to block 275. Otherwise, the method 200 proceeds to block 255.

In block 255, the controller 138 determines whether the return ratio is greater than a third return ratio threshold. The third return ratio threshold is less than the second return ratio threshold. For example, in the illustrative embodiment shown in FIG. 4, the value of the third return ratio threshold is 0.1. This value is exemplary and may be different in other embodiments. If the controller 138 determines that the return ratio is greater than the third return ratio threshold, the method 200 proceeds to block 270. If no, the method 200 proceeds to block 260.

In block 260, the controller 138 classifies the return 162 as a non-amorphous target 134. The method 200 then proceeds to block 265.

In block 265, the controller 138 transmits, to a point cloud controller 129, data representing the return 162 for inclusion in point cloud data. In an embodiment, the data includes the intensity 165, the quantity of derivative peaks 174, and the return ratio. In a refinement, the data may further include a flag indicative of classification of the return 162 as a valid signal from a non-amorphous target 134. The point cloud data is further processed by the point cloud controller 129 to identify the objects represented by the point cloud data to provide a digital representation of the surrounding area in the vicinity of the machine 100. In an embodiment, the point cloud controller 129 may also generate a digital representation of the surrounding area in the vicinity of the machine 100 based on the processed point cloud data. For an accurate representation of the surrounding area and objects in the surrounding area, only data representative of valid returns, from non-amorphous targets 134, are included in the point cloud data.

In block 270, the controller 138 classifies the return 162 as from a phantom target 135 and associates a confidence level with that classification. This confidence level represents a lower confidence level in the accuracy of the classification relative to the confidence levels of blocks 275 and 280. The method 200 proceeds to block 290.

In block 275, the controller 138 classifies the return 162 as from a phantom target 135 and associates a confidence level with that classification. This confidence level represents a medium confidence level that is higher than the confidence level of block 270 but lower than the confidence level of block 280. The method 200 proceeds to block 290.

In block 280, the controller 138 classifies the return 162 as from a phantom target 135 and associates a confidence level with that classification. This confidence level is a high confidence level, that is higher than the confidence levels of blocks 270 and 275. The method 200 proceeds to block 290.

In block 290, the controller 138 excludes a return 162 that has been classified as a phantom target 135 from inclusion in the point cloud data by withholding (e.g., not transmitting to the point cloud controller 129) such data from the point cloud controller 129 (the point cloud controller 129 being configured to process the point cloud data to identify the objects and/or terrain represented by the point cloud data).

By removing returns 162 from phantom targets 135 (such as dust clouds, fog, smoke, rain, falling snowflakes, and/or the like), the accuracy of the digital representation of the area in the vicinity of the machine 100 is improved. In some embodiments, the controller 138 may transmit a notification that a phantom target 135 has been detected on a user interface 146. The notification may also identify the confidence level associated with the detection of the phantom target 135.

Because only data representative of valid returns from non-amorphous targets 134 are included in the point cloud data, the digital representation of the vicinity of the machine 100 utilized by the machine controller 128 to control movement of the machine 100 (or a portion of the machine 100) is more accurate since it does not include phantom targets 135. As such, movement of the machine 100 may be controlled autonomously (or semi-autonomously) based on the result of the classifying of blocks 260, 270, 275, or 280. Furthermore, in some embodiments, a notification that a phantom target 135 has been detected may be displayed on a user interface 146. For instance, a passenger in an autonomously controlled car may see on a display 156 of a user interface 146 a notification that a dust cloud 126 (or fog, or rain, or smoke, or falling snow) has been detected. In some embodiments, the notification may include an indicator of the number of phantom targets that have been detected, or an indicator of the density of those phantom targets.

Also disclosed is a method of controlling the movement of the machine 100 or a portion of the machine 100. The method may comprise processing, by the controller 138, a waveform 160 based on reflected light 150 and a derivative 172 of the waveform 160. The waveform 160 includes a return 162. The method may further comprise classifying, by the controller 138, the return 162 as a phantom target 135 or a non-amorphous target 134 based on a result of the processing. The method may further comprise controlling, by a machine controller 128, movement of the machine 100 or a portion of the machine 100 based on a result of classifying the return 162. The method may further include displaying on a user interface 146 a notification when the phantom target 135 has been detected.

Also disclosed is a method for identifying phantom target 135 returns 162. In an embodiment, the method may comprise processing, by a controller 138, a waveform 160 detected based on reflected light 150, the waveform 160 including a return 162. The method may further comprise processing, by the controller 138, a rate of change in light energy 172 for the waveform 160 and classifying, by the controller 138, the return 162 as a phantom target 135 or a non-amorphous target 134 based on the processing of the waveform 160 or the processing of the rate of change in light energy 172. The method may further comprise, if the return 162 is classified as a phantom target 135, associating a confidence level with the classification of the return 162 as the phantom target 135.

The features disclosed herein may be particularly beneficial for autonomous control (or semi-autonomous control) of machines 100 or portions of machines 100 because the features disclosed herein improve the accuracy of the point cloud data, and the resulting digital representation of the vicinity of the machine 100 utilized by the machine controller 128 to control movement of the machine 100 (or portion of the machine 100). No element/component, act/action performed by any element/component, or instruction used herein should be construed as critical or essential unless explicitly described as such. Additionally, the phrase "based on" is intended to mean "based, at least in part, on" unless explicitly stated otherwise. Furthermore, the articles "a" and "an," as used herein, are intended to include one or more items, and may be used interchangeably with "one or more." In the event only one item is intended, the term "one" or similar language is used. Moreover, the terms "has," "have," "having," or the like, as also used herein, are intended to be open-ended terms.

What is claimed is:

1. A method for controlling movement of a machine or a portion of the machine, the method comprising:
processing, by a controller, a waveform based on reflected light reflected from a target, and a derivative of the waveform, the waveform including a return;
classifying, by the controller, the return as from a phantom target or a non-amorphous target based on a result of the processing; and
controlling, by a machine controller, movement of the machine or the portion of the machine based on classifying the return,
wherein the derivative includes one or more derivative peaks associated with the return, and classifying the return as the phantom target and associating a first confidence level with the return when a quantity of derivative peaks associated with the return is greater than or equal to a first derivative threshold.

2. The method of claim 1, further including displaying on a user interface a notification when the phantom target has been detected, wherein the notification includes information identifying the phantom target, and wherein the phantom target includes dust, fog, smoke, rain or falling snowflakes.

3. The method of claim 1, further comprising:
determining, by the controller, a return ratio for the return, wherein the return has a predominant peak, an intensity of the predominant peak, a return width and an integral, wherein the return ratio is a quotient resulting from dividing the return width by the intensity; and
classifying the return as the phantom target and associating a first confidence level with the return when the return ratio is greater than or equal to a first return ratio threshold.

4. The method of claim 3, further comprising classifying the return as the phantom target and associating a second confidence level with the return when the return ratio is less than the first return ratio threshold and is greater than a second return ratio threshold, wherein the second return ratio threshold is less than the first return ratio threshold, and wherein the second confidence level is lower than the first confidence level.

5. The method of claim 4, further comprising classifying the return as the phantom target and associating a third confidence level with the return when the return ratio is less than or equal to the second return ratio threshold and is greater than a third return ratio threshold, wherein the third return ratio threshold is less than the second return ratio threshold, and wherein the third confidence level is lower than the second confidence level.

6. The method of claim 1, further comprising classifying the return as the phantom target and associating a second confidence level with the return when the quantity of derivative peaks associated with the return is less than the first derivative threshold and greater than a second derivative threshold, wherein the second derivative threshold is less than the first derivative threshold, and the second confidence level is lower than the first confidence level.

7. The method of claim 1, wherein controlling movement of the machine or the portion of the machine includes:

adjusting a direction of movement of the machine or the portion of the machine, increasing a speed of movement of the machine or the portion of the machine, decreasing the speed of movement of the machine or the portion of the machine, or stopping movement of the machine or the portion of the machine.

8. A system for identifying phantom target returns, the system comprising:

an emission and detection module configured to generate and emit a laser light beam and to detect reflected light from when the laser light beam is incident upon a target; and a controller configured to:

process a waveform detected based on the reflected light, the waveform including a return, wherein when processing of the waveform, the controller is configured to determine an intensity of a predominant peak of the return, a return width and an integral of the return;

process a rate of change in light energy detected for the waveform; and classify the return as a phantom target or a non-amorphous target based on processing of the waveform or processing of the rate of change in light energy.

9. The system of claim 8, wherein the controller is further configured to withhold the return from inclusion in data representative of light reflected from a target area when the return is classified as the phantom target.

10. The system of claim 8, wherein the controller is further configured to classify the return as the phantom target based on a quantity of inflection points in the rate of change in light energy of the return.

11. The system of claim 10, wherein the controller is further configured to associate a confidence level with a classification of the return when the return is classified as the phantom target, wherein the confidence level is:

high when the quantity of inflection points is greater than or equal to a first threshold, medium when the quantity of inflection points is greater than a second threshold, and low when the quantity of inflection points is less than or equal to the second threshold, wherein the first threshold is greater than the second threshold.

12. The system of claim 8, wherein the return has a return ratio based on return width and return intensity, and wherein the controller is further configured to classify the return as the phantom target based on the return ratio.

13. The system of claim 12, wherein the controller is further configured to associate a confidence level with a classification of the return when the return is classified as the phantom target, wherein the confidence level is high when the return ratio is greater than or equal to a first return ratio threshold, the confidence level is medium when the return ratio is greater than a second return ratio threshold, and the confidence level is low when the return ratio is greater than a third return ratio threshold, the first return ratio threshold greater than the second return ratio threshold, the second return ratio threshold greater than the third return ratio threshold.

14. A method for identifying phantom target returns, the method comprising:

processing, by a controller, a waveform detected based on reflected light reflected from a target, the waveform including a return;

processing, by the controller, a rate of change in light energy for the waveform;

classifying, by the controller, the return as a phantom target or a non-amorphous target based on processing of the waveform or processing of the rate of change in light energy; and associating a confidence level with a classification of the return as the phantom target when the return is classified as the phantom target, wherein the return has a return ratio, and the rate of change in light energy for the waveform has a quantity of inflection points, and wherein:

the return is classified as the phantom target and the confidence level is high when the return ratio is greater than or equal to 0.3 or the quantity of inflection points is greater than or equal to four;

the return is classified as the phantom target and the confidence level is medium when the return ratio is greater than 0.2 or the quantity of inflection points is greater than three; and the return is classified as the phantom target and the confidence level is low when the return ratio is greater than 0.1.

15. The method of claim 14, wherein the return has a predominant peak and an intensity of the predominant peak, and wherein the method further comprises classifying the return as the non-amorphous target when the intensity of the predominant peak is greater than or equal to a saturation threshold.

16. The method of claim 14, wherein the return has an integral, and wherein the method further comprises classifying the return as the non-amorphous target when the integral of the return is greater than or equal to a retro-reflector threshold.

17. The method of claim 14, further comprising:

withholding the return from inclusion in data representative of light reflected from a target area when the return is classified as the phantom target, wherein one or more digital representations, of a surrounding area in a vicinity of the machine, are generated using the data.

* * * * *